Aug. 21, 1962 C. R. SACCHINI ETAL Re. 25,229

SPRING CLUTCH MECHANISMS

Original Filed Jan. 30, 1957

INVENTOR.
COLUMBUS R. SACCHINI
DONALD R. TOMKO
BY George M. Soule
ATTORNEY

United States Patent Office

Re. 25,229
Reissued Aug. 21, 1962

25,229
SPRING CLUTCH MECHANISMS

Columbus R. Sacchini, Willoughby, and Donald R. Tomko, Euclid, Ohio, assignors to Curtiss-Wright Corporation, New York, N.Y., a corporation of Delaware Original No. 2,968,380, dated Jan. 17, 1961, Ser. No. 637,239, Jan. 30, 1957. Application for reissue Nov. 13, 1961, Ser. No. 152,970
4 Claims. (Cl. 192—81)

Figure 1:
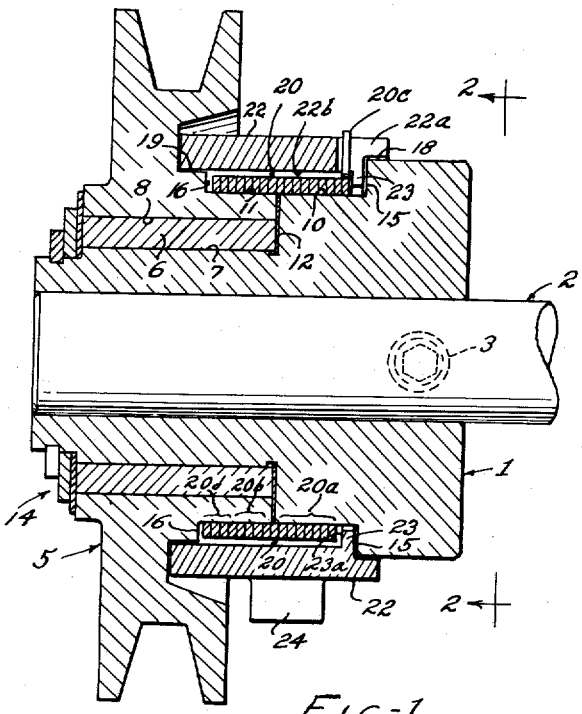

Matter enclosed in heavy brackets [ ] appears in the original patent but forms no part of this reissue specification; matter printed in italics indicates the additions made by reissue.

Spring or coil clutch mechanisms when arranged for intermittent drive of a rotary load from a continuously rotating shaft or the like commonly have coaxial input and output relatively rotatable circular drums and a helical coil friction spring is resiliently preloaded at least on the input drum, *being otherwise unconnected with that drum (full-floating relative thereto), and being* [and] reactively connected to the output drum. Thereby the clutch spring it self energizing by friction normally to grip the two drums and drive the load, but the arrangement permits the input drum to overrun the spring in frictional contact therewith (in other words permits effectual disengagement of the clutch mechanism) when the coil of the spring which is farthest from the output drum along the rotational axis (input "free" end coil) is arrested. In such spring clutches a control sleeve or collar loosely enveloping the spring and rotatable therewith is commonly attached to the input-drum associated free end coil of the spring, and a control finger or plunger engages a release shoulder on the sleeve to disengage the clutch.

In case the clutch spring is *resiliently* [resilient] or elastically preloaded on the output drum as well as on the input drum, but is otherwise unattached to either drum, thus being[, as commonly known in coil clutches, a full floating type clutch spring] *full-floating with respect to both drums, i.e. doubly full-floating,* then when the control sleeve or collar is arrested by the stop finger the output drum and mechanism connected therewith can overrun the clutch spring and come to a stop unrestrained by the clutch mechanism except for the overrunning friction of the spring coils on the output drum. If on the other hand the clutch spring is positively secured to the output drum and the load has considerable inertia and kinetic energy then, during the clutch disengaging operation, the spring either tends to be injured by excessive expansion of its coils or, if expansion is limited as by radial abutment of its coils with the control sleeve, then the disengaging operation is likely to be accompanied by undesirable shock to the mechanism. Thus, *except when substantially exact positioning of output is required, as in indexing and similar operations,* [usually] the clutch spring is *usually* preloaded for necessary reactance and self energization on the output drum as well as on the input drum. Heretofore, we believe, such preloading of the clutch spring on both the input and output drum surfaces has been approximately uniform at least by intention or design.

When such uniform or nearly uniform preloading, as just above referred to, is practiced then during all operating times when the clutch is disengaged the input-drum-associated coils ride the continuously rotated input drum with appreciable force (generally proportional to the preloading), producing undesired temperature rise. More important, in practically all types of service, the input-drum-associated coils tend to vibrate or flutter, producing so-called fretting or vibration corrosion of the coacting coil and drum surfaces and premature wearing out of those surfaces.

We have discovered that by providing a materially greater preloading or interference fitting relationship between one or more coils of [the] *a doubly* full floating clutch spring and the output drum than any coils of the spring have in respect to the input drum then (assuming the kinetic energy of the load is sufficient as is almost always true) all the input-drum-associated coils are moved, e.g. expanded, entirely clear of the input drum and so remain as long as the output drum is prevented from being turned backward following the clutch disengaging operation and overrunning of the output drum relative to the spring. Average loads have sufficient built-in friction and inertia to prevent retrograde motion of the output drum after it comes to a stop; and in exceptional cases or whenever required many simple but effectual antirotational or no-back devices are applicable to prevent retrograde [rotary] *or other undesired angular* motion following [forward motion] *disengagement.*

We have found further that by the use of a relatively simple formula derived from well recognized principles of helical spring or coil clutch construction and applicable to the materials and spring stock section shapes most effectually used therein, the necessary or desirable amount of diametral clearance between the input drum and its associated coils during clutch disengagement can be reliably predicted as a function of overrunning torque resulting from a selection of (a) suitable numbers of coils relatively heavily elastically preloaded on the output drum and (b) the degree or amount of elastic preloading of those coils on such drum.

Figure 2:
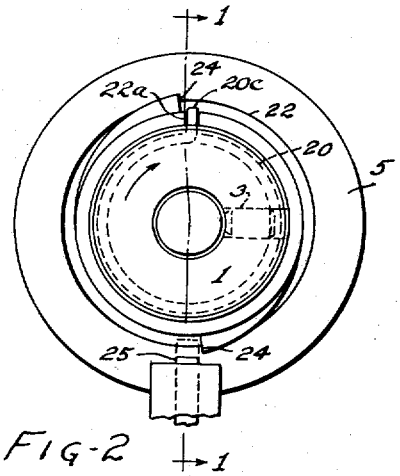
Figure 3:
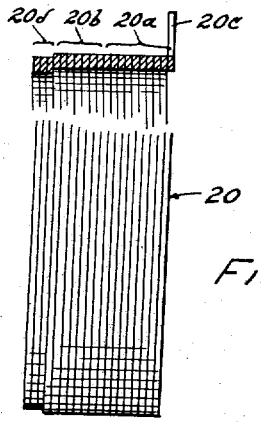

In the accompanying drawing FIG. 1 is a double scale central longitudinal sectional assembly view of an illustrative embodiment of the present clutch mechanism. FIG. 2 is a full scale end elevation of the mechanism viewed as indicated on FIG. 1 by the line 2—2. FIG. 3 is fragmentary double scale sectional and elevational view of a preferred form of clutch spring.

In FIG. 1, the input clutch drum member 1 is shown in the form of an adapter for a power shaft 2 assumed to have suitable bearing supports not shown. The drum member 1 is suitably secured as by a screw 3 to turn continuously with the power shaft. The output drum member 5 is shown in the form of a pulley supported for rotation relative to the shaft 2 and drum member 1 as by a suitable bearing bushing 6 between a reduced diameter surface portion 7 of the input drum member and an internal circular surface 8 of the pulley hub (e.g. bushing press fitted in the pulley hub). The circular clutch drum surfaces 10 and 11 are preferably cylinders of equal diameter formed on the drum member 1 and 5 respectively. The axially adjacent inner end surfaces of the members 1 and 5, as shown, are maintained in closely spaced apart relationship as by a washer 12 between the drum members in cooperation with a snap ring and washer assembly 14 carried by a tubular portion of the drum member 1, left, FIG. 1. Axial shoulders 15 and 16 on the drum members 1 and 5 adjacent respective drum surfaces 10 and 11 provide an annular channel for the clutch spring 20. The channel, as shown, is partly occupied by a rib portion 23 of a clutch control sleeve 22, described later, the involved parts being dimensioned to insure adequate free working clearance for the clutch spring 20 axially of the spring.

Clutch spring 20, as shown particularly in FIG. 3 in a relaxed state, is of generally cylindrical form with input-drum-associated coils 20a and output-drum-associated coils 20b and 20d. The endmost free end coil 20a has an outwardly projecting release toe 20c formed thereon. For clutch disengagement purposes the control sleeve 22 is axially slotted at 22a to receive the toe 20c, and the sleeve 22 is supported for free rotation relative to both clutch drum members 1 and 5 as on circular surfaces 18 and 19 of the drum members adjacent to their shoulders 15 and 16 respectively. The control sleeve 22 has one or more clutch release shoulders or abutments 24, two being shown, projecting radially therefrom for engagement by a stop pin or plunger 25 as partially shown in FIG. 2. The clutch mechanism is shown in FIG. 1 with the clutch spring 20 of FIG. 3 in torque-transmitting or engaged condition or with all its coils contracted against the drum surfaces. The stop pin 25 is projected into the path of rotation of the shoulders or abutments 24 by any suitable means, not shown, in order to disengage the clutch mechanism by arresting rotation of the clutch spring.

Referring further to FIG. 3 the coils 20a of spring 20 are made with their normal inner diameters smaller than the external diameter of input drum surface 10 or so as to be in elastically or resiliently preloaded relation thereto sufficiently to insure their self energization on the input drum. Output-drum-associated coils 20b, as shown, have the same diameters as coils 20a. A preferably limited number of output-drum-associated free end coils 20d of the spring, for example three free end coils, are formed (e.g. as part of the same automatic coiling machine operation which forms coils 20a and 20b) in radially offset relationship to the other coils inwardly toward the coil axis so as to have materially greater elastic or resilient preloading on the output drum surface 11 than any of the other coils have on their coacting drum surfaces. An increase in the number of coils 20d relative to the number of coils 20b at any particular preloading of coils 20d will increase the overrunning torque. The number of coils 20d and the amount of radial offset of those coils (exaggerated in FIG. 3) are selected particularly in relation to the index of the spring (mean coil diameter divided by the radial dimension or height of the individual coils) so that, assuming the output drum member 5 has substantial mass or is connected to a body having substantial mass supported for relatively free rotation, the operation of arresting the rotation of the control sleeve to disengage the clutch mechanism will result in overrun of the output drum member 5 in frictional contact with the coils 20d, and the overrunning torque thereby applied to the clutch spring 20 will, in turn, result in expansion of its coils 20a completely clear of the input drum surface 10.

The coils 20a and 20b, incidentally, become approximately uniformly expanded by the overrunning action of drum surface 11 on the coils 20d so that the latter coils, by remaining in seated position on the drum surface 11, tend to hold all the expanded coils in uniformly spaced relationship to their associated drum surfaces 10 or 11.

The reason for limiting the number of coils 20d in relation to the number of coils in the clutch spring which are associated with the output drum surface 11 is so that, when providing a minimum (axial-space-conserving) total number of coils in the spring in order to carry the expected load, there will be a considerable number of the spring coils expanded during clutch disengagement as described above. Thereby if, after clutch disengagement, unusual conditions (e.g. low friction in the driven device or load) should permit back-travel or retrograde angular movement of the output drum following its overrun, a greater angular retrograde movement would be required in order to allow reseating of any of the spring coils on the input drum than would be required if nearly all of the coils (20b and 20d) around the output drum surface 11 were to have equal, relatively heavy, preloading on said surface. In other words the relatively lightly preloaded coils 20b, when expanded, augment the expanded coils 20a in safeguarding against possible back-travel as just discussed above.

The radial distance between the outer peripheral surfaces of the spring coils 20a and 20b and the inner peripheral surface 22b of the release sleeve 22, when the coils are gripping, is preferably somewhat greater than the distance the coils 20a and 20b are expanded when the output drum surface 11 frictionally overruns the relatively heavily preloaded coils 20d. Thereby clutch disengagement cannot possibly be accompanied by shock or noise. By design, however, the spring index and the rest can be chosen in reference to the torque required to cause the output drum surface 11 to overrun the clutch spring coils 20d and with reference to the radial clearance between the coils and the sleeve 22 when the coils 20a and 20b are in gripping position, so that torque of such magnitude will, during disengagement of the clutch, expand the input-drum-associated coils into light contact with the interior surface of the sleeve 22, thereby further insuring centering of all of the expanded coils with reference to their associated drum surfaces.

*In known spring clutch mechanisms of the type shown, for example, in FIG. 1, axial shoulders such as 15 and 16 formed on respective drum members, as 1 and 5 thereof, limit movement of the clutch spring 20 axially out of position.* [When a full floating type clutch spring, such as 20 hereof FIG. 1, is unconnected with its associated clutch drums except by elastic preloading thereon, then some means is required to limit axial movement of the spring out of position. Shoulders similar to 15 and 16 of drum members 1 and 5 hereof usually serve that purpose.] We have found that if the free end of the clutch spring (e.g., the coil supporting the toe 20c) which is associated with the input drum is permitted at times to rub axially on a shoulder such as 15, which turns with the drum 1 during clutch disengagement, then fretting corrosion and wear frequently results, evidently because the rubbing contact produces vibration of the clutch spring or (possibly) spasmodic contraction of the coils 20*a* into contact with the input drum surface 10. Accordingly, as one convenient means for preventing contact between the spring and the input drum member 1 axially of the spring during clutch disengagement, the control sleeve 22, which is constrained to rotate only when the clutch spring rotates, is provided with an inwardly extending annular rib or rib portion 23 having a shoulder surface 23a axially adjacent the free end coil of the clutch spring 20. Whenever the clutch spring moves or tends to move toward the right (FIG. 1) out of its normal or free-working position, such movement is blocked by the rib 23 whose rightward movement, in turn, is blocked by the shoulder 15 of the input drum member 1. The rib 23 during clutch disengagement, is normally out of contact with the shoulder 15 and it is never in tight contact therewith.

In the herewith-illustrated *doubly* full floating [type] spring clutch construction, as opposed to a construction in which the output end of the clutch spring is positively connected to the load, the maximum overrunning torque which operates to expand the coils 20a completely clear of the input drum surface 10 is automatically limited by the maximum static unit pressure the coils 20d can be caused to exert radially against the output drum surface 11 in being elastically preloaded thereon by interference fitting; and that unit pressure is, of course, limited by the yield point of the spring material. Experience has demonstrated that if all the coils of the clutch spring have uniform resiliency (as when all the coils have uniform physical properties, and are of approximately uniform cross section) it is then impossible (in the absence of auxiliary means) so to preload the coils 20d on the output drum as to produce, through overrun of the output drum an expansion of the coils 20a (and/or 20b) such as could injure those coils although the mechanism has no means capable of limiting their expansion. Thus the internal surface 22b of the control sleeve 22 of the present construction can be at any desired radial distance from the external peripheral surfaces of the coils 22a and 22b when those coils are contracted against their associated clutch drums.

Since the overrunning torque necessary to cause expansion of the coils 20a out of contact with the drum surface 10 will depend upon (a) the spring index or the relationship between coil diameter and coil cross section, (b) the coefficient of friction between output drum and clutch spring; and (c) the number of coils 20d in interference fitting relation to output drum surface 11, no universally applicable or simple rule of procedure or construction can be given such as would indicate the operating limits or proportions which have to be observed in the successful practice of the present invention. A working formula for uniform section spring stock is given near the end of this specification.

We have fully tested the herewith illustrated spring clutch assembly in intermittently driving a rotary fan at around 1725 r.p.m. In the installation tested the clutch drums have approximately equal diameters of 1.313", the normal inner spring diameter at coils 20a and 20b is approximately 1.290" and the normal inner spring diameter of coils 20d is approximately 1.264"[, thus]. *Thus* the interference fit or elastic preloading of coils 20a and 20b on the drum surfaces is approximately .023" whereas the preloading of the coils 20d on output drum surface 11 is approximately .049". The spring 20 is of die drawn oil tempered steel wire, A.I.S.I.c–1065, and has an index of about 22.5. The torque required to cause overrun of the output drum member 5 in the coils 20d (in case member 5 is a zinc alloy die casting) is approximately 7.0 inch-ounces. That torque expands the coils 20a and 20b so that their inner diameters are approximately .022" larger than the associated drum diameters or, in other words, the total expansion of those coils from their normal or relaxed condition as shown in FIG. 3, is about .045". The coils 20a and 20b could withstand a much larger expansion within their elastic limits. Since, with the materials and dimensional relationships given above, more than sufficient separation of the coils 20a from the input drum surface 10 is produced, it is apparent that the difference in the elastic preloading of the coils 20d and 20a on their associated drum could have been somewhat less and/or the spring index could have been somewhat lower.

In conducting the above described tests it was found that friction in the fan drive assembly, not shown, assisted by slight and practically unavoidable frictional drag in the bearings 6, 7, 8 was adequate always to maintain the input-clutch-drum-associated coils 20a completely free from the drum surface 10 (during protracted clutch disengagement or idle periods) despite the inherent tendency of the coils 20a and 20b to reseat themselves on the drums.

In an expanding-to-grip type of spring clutch the coils corresponding to 20d in FIG. 3 would be radially offset outwardly from the other coils in the preferred practice of the present invention, and "uncoiling" on part of the input-drum-associated coils would be a contraction of the coils.

FORMULA

In any clutch spring made from constant cross section and otherwise uniform spring stock, overrunning torque ($T_0$) is the product of a value known in the art as overrunning torque ratio: ($K_0$), or $$1-\frac{1}{e^{2\pi Nf}}$$

(wherein "e" is the base of natural logarithms or 2.7183; "N" is the number of coils in interference fit, and "f" is the coefficient of friction) multiplied by so called "energizing torque"; ($T_e$) or $$\frac{2EIA}{D^2}$$

(wherein "E" is the modulus of elasticity of the spring stock; "I" is the moment of inertia of the spring stock section; "A" is the diametral deflection or interference fit of the spring coils on the drum, and "D" is the mean diameter of the various coils). Thus $T_0=K_0T_e$.

Assuming in the present clutch mechanism that th elastic preloading of coils 20d is selected to produce suffi cient overrunning torque to expand coils 20a clear of th input drum during clutch disengagement it is evident tha the overruning torque must then equal the spring momen of coils 20a and 20b. The desired diametral clearance o the coils 20a in relation to the input drum 10 can be there by equated with the other necessary design values or fac tors involved, as follows:

$$A_c=A_dK_0-A_n$$

(wherein "$A_c$" is such desired diametral clearance of coil 20a; "$A_d$" is the diametral deflection or amount of inter ference fitting of coils 20d on the output drum; "$K_0$" i the overrunning torque ratio as expressed above (involv ing coils 20*d*) and "$A_n$" is the diametral deflection or ener gizing interference fitting of coils 20a on the input drur 10). The value $A_n$ is subtracted, as indicated, because o the portion of the total overruning torque which is re quired to obtain zero clearance or to overcome the initia preloading of coils 20a.

Regardless of the selected number of relatively heavil preloaded coils 20d and the amount of interference fit the have on drum 11 (which is, of course, within the elasti limit or yield point of the spring material) the stress in th expanded coils 20a (or 20b) cannot exceed the initia stress involved in the elastic preloading of coils 20d o drum 11. This is believed evident from the formula fc "overrunning torque ratio" given above, since its valu must be some fraction of 1. The formula for spring mc ment for a given diametral deflection is the same as fc energizing torque.

We claim:

1. A friction coil clutch mechanism for coupling a cor tinuously rotating drive to an intermittently operate load, said mechanism comprising an approximately cylir drical input clutch drum, an approximately cylindric output clutch drum coaxial therewith, a [full-floatin type] helical clutch spring having coils elastically pr loaded radially against *an* approximately cylindrical su face [portions] *portion* of *the input drum* [respectiv drums], annular axial shoulders on respective drums fa ing respective end coil portions of the spring, a clutch r lease member and means supporting the release memb for rotation relative to the drums about their common ax and in a predetermined axial position in the mechanisn said release member being connected to an input-drum-a sociated end coil of the spring[,] for rotation integrall with the spring, means operable to stop rotation of the r lease member hence rotation of the spring to disengage th clutch mechanism, said release member having a portic interposed between such input-drum associated free en coil of the spring and the axial shoulder of the input drun 2. A friction coil clutch mechanism for coupling a co tinuously rotating drive to an intermittently operate driven load, said mechanism comprising an input clut drum, an output clutch drum coaxial therewith, a *doub* full-floating [type] helical clutch spring having coi elastically preloaded radially against respective drums, clutch release abutment connected to an input-drur associated end coil portion of the spring and facing ci cumferentially of the spring in its driving direction, and stop disposed to engage the abutment to stop rotation said end coil portion of the spring and thereby disenga the clutch mechanism, the elastic preloading radial for of one or more of the output-drum-associated coils of tl spring being greater than the elastic preloading radi force of any of the input-drum-associated coils of tl spring, the input drum having an axially presented shou der facing the input-drum-associated end coil of tl spring, and said clutch mechanism including a memb connected to the spring for rotational movement integral therewith, said member having a portion lying betwe said end coil and the shoulder.

3. A friction coil clutch mechanism for coupling a co uously rotating drive to an intermittently operated iven load, said mechanism comprising an approximately lindrical input clutch drum, an approximately cylinical output clutch drum coaxial therewith and of apoximately the same diameter as the input drum, a ubly full-floating [type] helical clutch spring all the ils of which have substantially the same cross sectional mensions, the spring being elastically preloaded radially ainst respective drums, a clutch release abutment concted to an input-drum-associated end coil portion of the ring and facing circumferentially of the spring in its driv- g direction, and a stop disposed to engage the abutment stop rotation of said end coil portion of the spring and ereby disengage the clutch mechanism, there being a fference in diameter between coils at opposite end rtions of the spring when the spring is in a relaxed ate such that, in operating position, the elastic preload- g force of at least one coil of the spring on the output um is on the order of twice the elastic preloading force any coils of the spring on the input drum.

*4. A friction coil clutch mechanism for coupling a conuously rotating drive to an intermittently operated iven load, said mechanism comprising an approximately lindrical input clutch drum, an approximately cylindrical output clutch drum coaxial therewith and of approximately the same diameter as the input drum, a helical clutch spring all the coils of which have substantially the same cross sectional dimensions, the spring being elastically preloaded radially against respective drums and being otherwise unconnected for rotation with the input drum, there being a difference in diameter between coils at opposite end portions of the spring when the spring is in a relaxed state such that, in operating position, the elastic preloading force of at least one coil of the spring on the output drum is on the order of twice the elastic preloading force of any coils of the spring on the input drum, and control means connected for operation to arrest rotation of an input-drum-associated end coil of the spring, thereby to disengage the clutch mechanism.*

References Cited in the file of this patent or the original patent

UNITED STATES PATENTS

| | | |
|---|---|---|
| 390,029 | Lombard | Sept. 25, 1888 |
| 1,641,419 | Elsey | Sept. 6, 1927 |
| 2,298,970 | Russell et al. | Oct. 13, 1942 |
| 2,685,949 | Dunlap | Aug. 10, 1954 |
| 2,922,220 | Sacchini | Jan. 16, 1960 |